US008584268B2

(12) United States Patent
Han

(10) Patent No.: US 8,584,268 B2
(45) Date of Patent: Nov. 19, 2013

(54) DUAL FLUSH TOILET DEVICES

(76) Inventor: James T. Han, Rockville, MD (US)

( * ) Notice: Subject to any disclaimer, the term of this patent is extended or adjusted under 35 U.S.C. 154(b) by 0 days.

(21) Appl. No.: 13/562,308

(22) Filed: Jul. 30, 2012

(65) Prior Publication Data

US 2013/0232678 A1 Sep. 12, 2013

Related U.S. Application Data

(60) Provisional application No. 61/634,974, filed on Mar. 9, 2012.

(51) Int. Cl.
*E03D 5/00* (2006.01)

(52) U.S. Cl.
USPC ............................ 4/405; 4/324; 4/415; 4/412

(58) Field of Classification Search
USPC ...................... 4/405, 415, 324, 325
See application file for complete search history.

(56) References Cited

U.S. PATENT DOCUMENTS

| | | | |
|---|---|---|---|
| 2,744,261 A | 5/1956 | Gram | |
| 3,487,476 A | 1/1970 | Stiern et al. | |
| 3,795,016 A | 3/1974 | Eastman | |
| 3,894,299 A | 7/1975 | Cleary | |
| 3,988,786 A | 11/1976 | Lehfeldt | |
| 4,014,050 A | 3/1977 | Goldsworthy | |
| 4,096,591 A | 6/1978 | Awis | |
| 4,110,850 A | 9/1978 | Tedei | |
| 4,135,263 A | 1/1979 | Anderson | |
| 4,145,774 A | 3/1979 | Sullivan | |
| 4,225,985 A | 10/1980 | Joshi et al. | |
| 4,293,964 A | 10/1981 | Riedel | |
| 4,356,576 A | 11/1982 | Gala | |
| 4,433,445 A | 2/1984 | Morris et al. | |
| 4,624,018 A | 11/1986 | Kurtz | |
| 4,764,995 A | 8/1988 | Harney | |
| 4,829,605 A | 5/1989 | Agostino | |
| 4,837,867 A | 6/1989 | Miller | |
| 4,864,665 A | 9/1989 | Toltzman | |
| 4,878,256 A | 11/1989 | Bagwell | |
| 4,881,279 A | 11/1989 | Harney | |
| 4,941,214 A * | 7/1990 | Harris | ............... 4/325 |
| 5,023,960 A | 6/1991 | Ratanagsu | |
| 5,117,513 A | 6/1992 | Burrowes | |
| 5,206,960 A | 5/1993 | Hooshley et al. | |
| 5,301,373 A | 4/1994 | Hull et al. | |
| 5,319,809 A | 6/1994 | Testa | |
| 5,400,445 A | 3/1995 | Hull | |
| 5,511,253 A | 4/1996 | Zamudio-Castillo et al. | |
| 5,555,573 A | 9/1996 | Jensen | |
| 5,673,440 A * | 10/1997 | Carmona | ............... 4/325 |

(Continued)

*Primary Examiner* — Gregory L. Huson
*Assistant Examiner* — Janie Christiansen

(57) ABSTRACT

A dual flush device is disclosed to provide a full flush for removing solid waste and a water-saving partial flush for removing liquid or light solid waste in a toilet. It includes a first flush handle attached to a shaft to raise a lever to open a flapper valve, and a second flush handle that overlaps the first handle and opens the flapper valve through the first handle. A float assembly is disclosed to be used either with the dual flush device or with the original single flush lever assembly to prematurely close an opened flapper valve and reduce water consumption. Using the original flapper valve in a conventional toilet tank, a dual flush function is achieved by any of the three implementation choices: (1) the dual flush device alone; (2) the dual flush device and a float assembly; and (3) a float assembly alone.

12 Claims, 13 Drawing Sheets

(56) References Cited

U.S. PATENT DOCUMENTS

| | | |
|---|---|---|
| 5,887,292 A | 3/1999 | Goren |
| 5,903,931 A | 5/1999 | Kolb, Sr. |
| 6,317,899 B1 | 11/2001 | Brewer |
| 6,704,945 B2 | 3/2004 | Bellmore |
| 6,775,859 B1 | 8/2004 | Gorginians |
| 6,785,913 B2 | 9/2004 | Ho |
| 6,823,534 B2 | 11/2004 | Li |
| 6,829,787 B1 | 12/2004 | Pipenburg |
| 6,898,808 B2 | 5/2005 | Molho et al. |
| 7,200,877 B2 | 4/2007 | Peng |
| 7,526,819 B2 | 5/2009 | Beaupre |
| 7,591,027 B2 | 9/2009 | Scruggs |
| 2003/0150053 A1* | 8/2003 | Rische et al. ............ 4/405 |
| 2004/0064879 A1 | 4/2004 | Hand |
| 2005/0044614 A1 | 3/2005 | McKee |
| 2006/0015993 A1 | 1/2006 | Hennessy |
| 2008/0295238 A1 | 12/2008 | Hawley et al. |
| 2009/0019627 A1 | 1/2009 | Le et al. |
| 2011/0041242 A1 | 2/2011 | Courtney et al. |

* cited by examiner

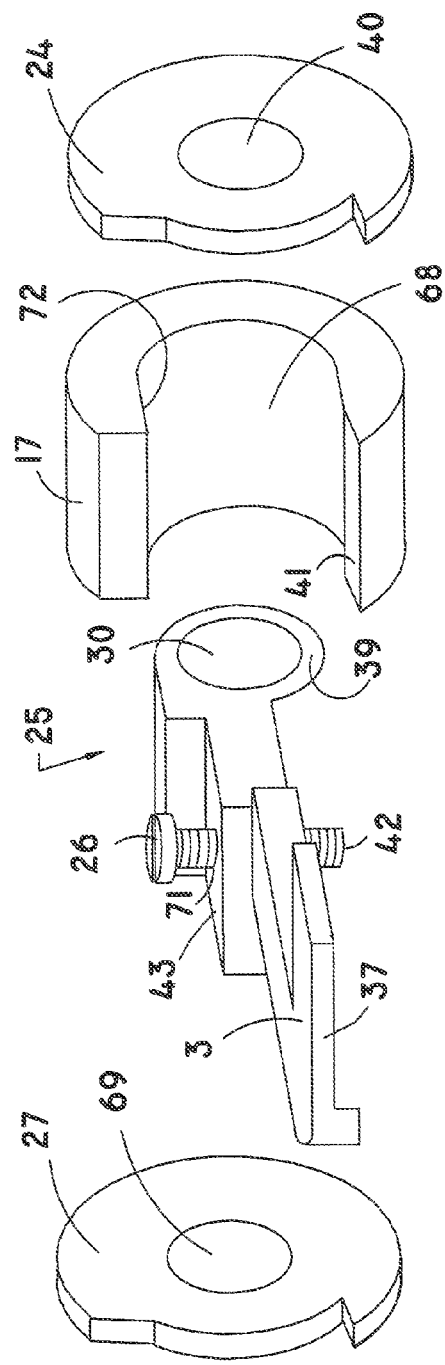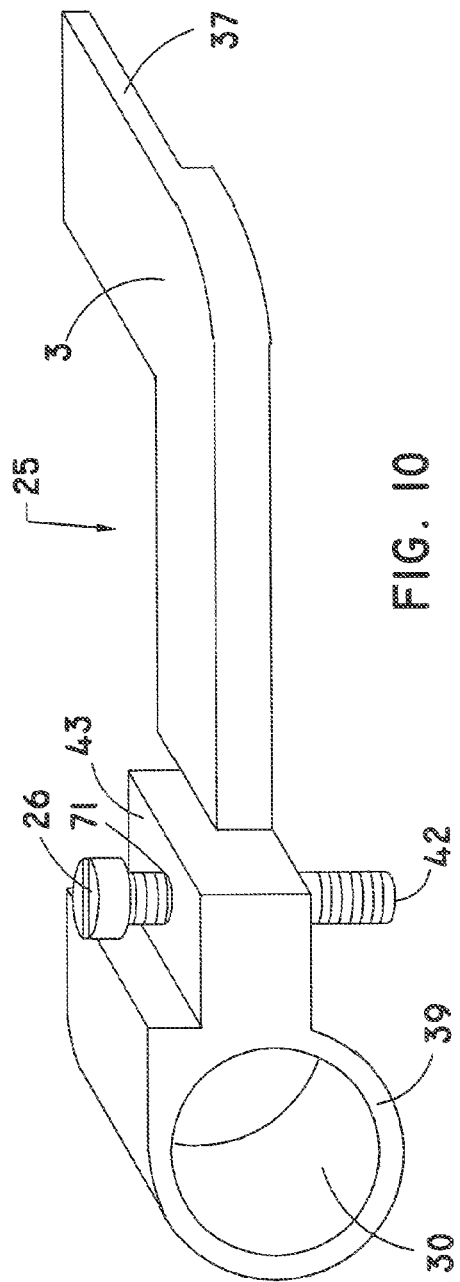
FIG. 9
FIG. 10

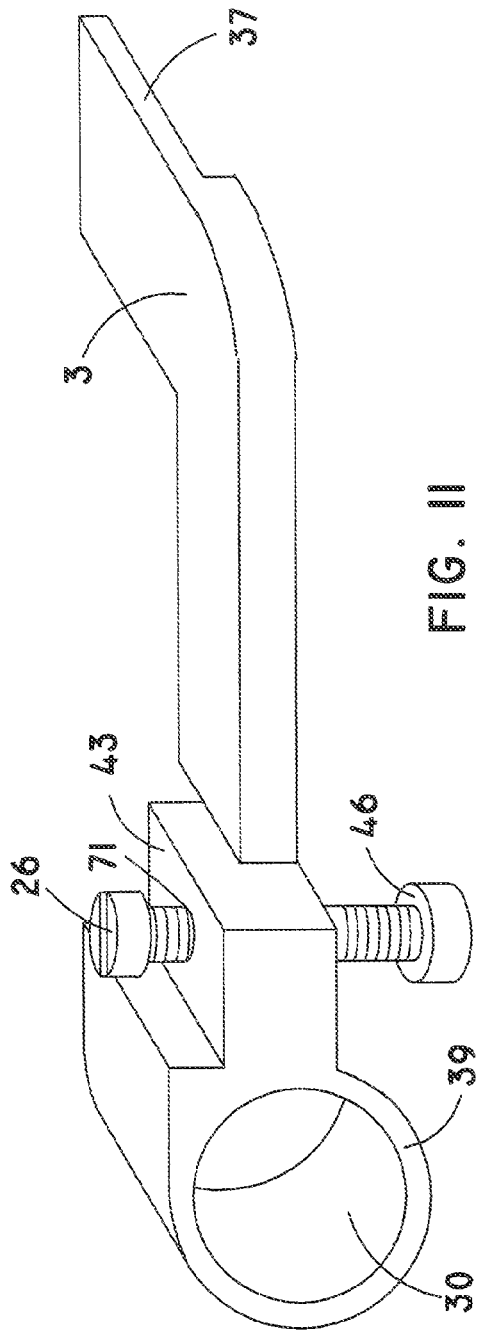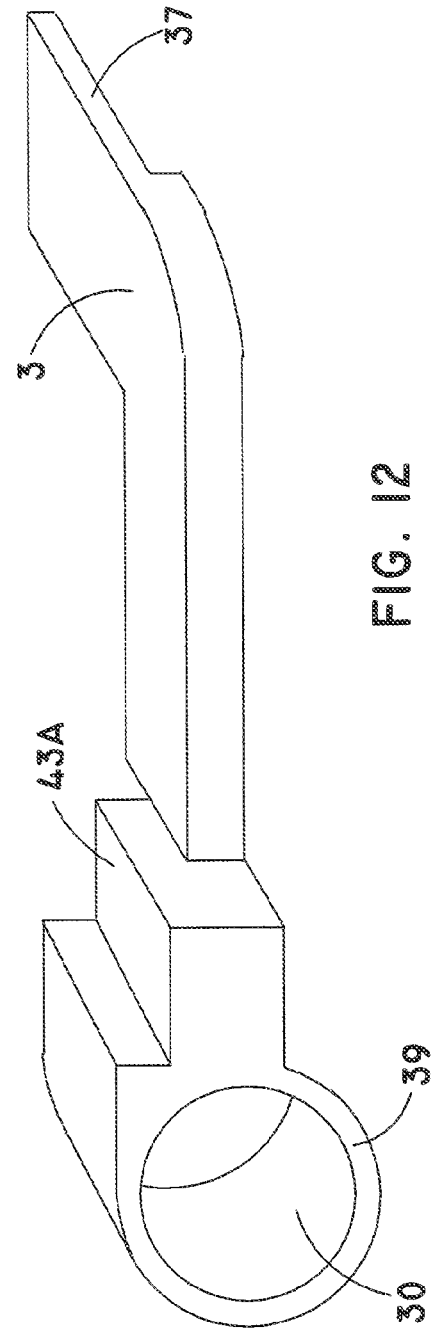

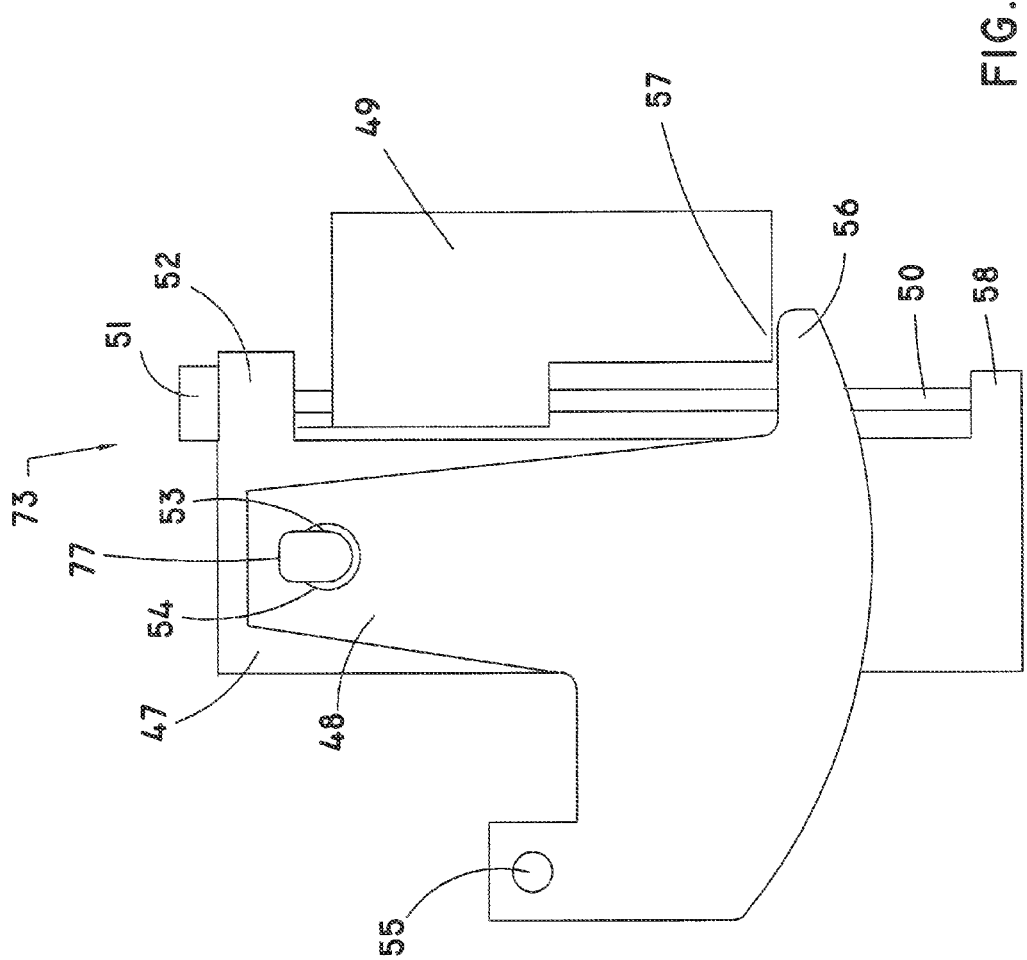

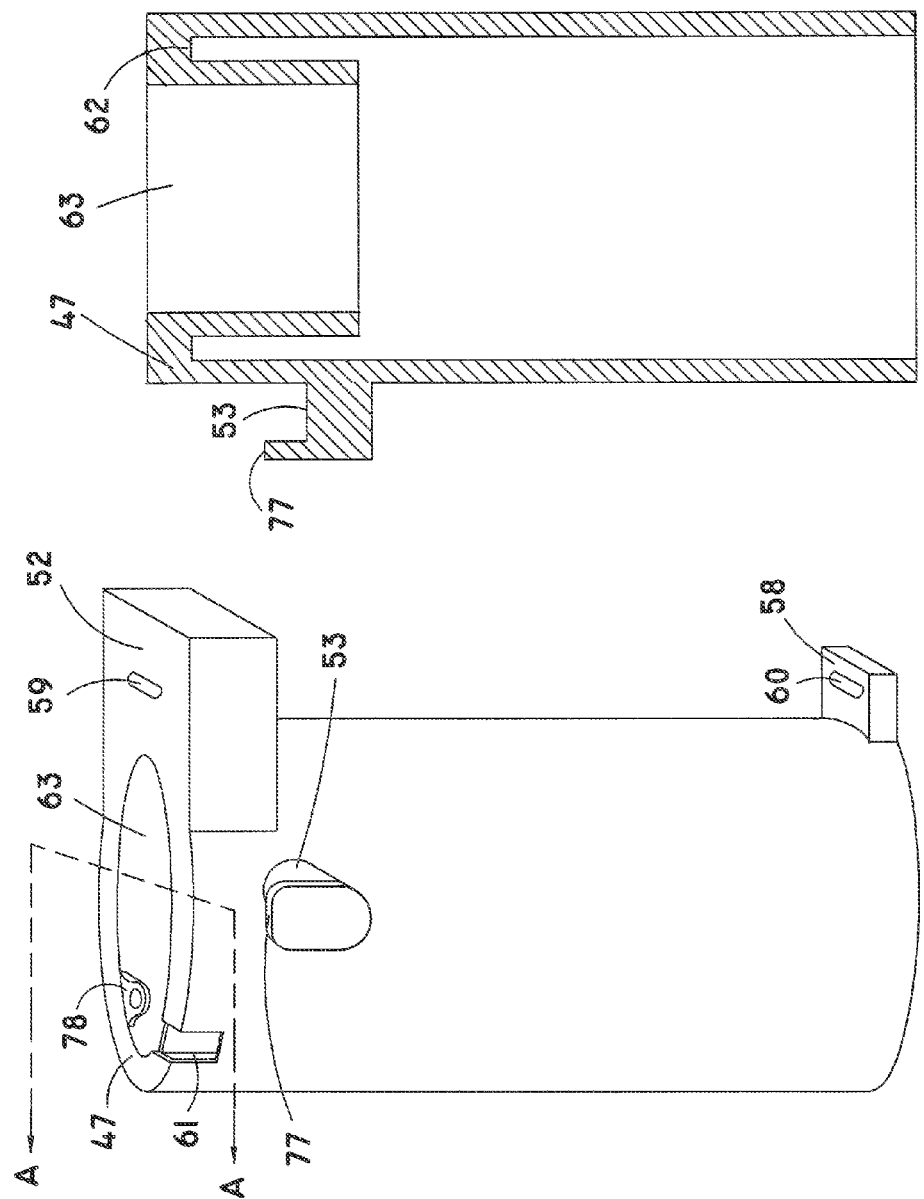

DUAL FLUSH TOILET DEVICES

CROSS-REFERENCE TO RELATED APPLICATIONS

This application claims the benefit of priority of U.S. Provisional Patent Application No. 61/634,974, filed Mar. 9, 2012, which is hereby incorporated by reference in its entirety.

FIELD OF THE INVENTION

The present invention relates generally to toilets and toilet flushing devices, mechanisms and systems. More specifically, the present invention relates to dual flush toilet devices.

BACKGROUND OF THE INVENTION

1. Description of the Prior Art

Water conservation is essential in addressing water shortage caused by climate change and population increase in many parts of the world. Since water consumption in toilet flushing is an important contributor to the household water usage, manufacturers have been making better toilets using less water in a full flush than those made a few decades earlier. Meanwhile, about four out of five toilet flushes remove mainly liquid waste (such as urine and a small amount of toilet paper) from the bowl into the discharge pipe below, and they do not need a full tank of the flushable water, which is defined herein as the water volume between the normal water level in the toilet tank (when the tank has been refilled) and the flush valve seat opening (located slightly above the tank bottom) and is designed to remove a full load of solid waste (such as feces). To reduce the water consumption, the prior art has revealed a number of dual flush toilet mechanisms to provide a user with two choices—a conventional full flush to remove solid waste and a partial flush to remove liquid waste using less water than in a full flush. A large number of prior art patents related to the dual flush toilet mechanisms have been published. For example, over 140 U.S. patents are referenced in U.S. Pat. No. 7,591,027. The prior art inventions can be generally divided into seven types based on overall characteristics.

Type 1 of the prior art provides two flush valves at different heights in a toilet tank, including a lower flush valve installed near the bottom opening of the tank and an upper flush valve installed at a certain height above the tank bottom. An example is discussed in U.S. Pat. No. 3,795,016. Each flush valve is connected with a metal chain to a separate flush lever. A handle for full flush is connected to one of the two concentric shafts that at its other end is fixed to the full flush lever. Similarly, a handle for partial flush is connected to the other concentric shaft that at its other end is fixed to the partial flush lever. To activate a full flush, depress the full flush handle to raise the full flush lever and open the lower flush valve to empty the tank water above the lower flush valve seat, as in a conventional single flush toilet. To activate a partial flush, depress the partial flush handle to raise the partial flush lever and open the upper flush valve to empty tank water above the upper flush valve seat. Type 1 of the prior art mechanisms is in general much bulkier than the original flush valve assembly in a conventional single flush toilet tank. Furthermore, it would be difficult to install the Type 1 mechanism because the toilet tank needs to be removed to replace the original flush valve and overflow tube assembly. In addition, the original flush lever assembly also needs to be replaced.

Type 2 of the prior art generally uses the original flapper valve in the toilet tank and replaces the flush lever assembly with a dual flush handle and lever assembly and a float assembly with engaging mechanism. A full flush is activated by depressing the full flush handle once as in a conventional single flush toilet. Similarly, a partial flush is activated by depressing the partial flush handle for which the amount of the water allowed to drain into the bowl is controlled by the float assembly. For example, U.S. Pat. No. 5,400,445 discloses a dual flush handle and lever assembly that includes a full flush handle attached to one of the two concentric shafts, a partial flush handle attached to other concentric shaft, a housing to enclose both shafts, two levers fixed to the two flush handles respectively at one end and connected at the other end to the flapper valve by a chain or the like, stop members to limit rotation and rising of both flush levers, and a hand-turning nut to fix the shaft housing to the square opening on an upper tank wall.

The dual flush handle and lever assembly is in use with a float assembly with engaging mechanism described in U.S. Pat. No. 5,301,373, which is slidably mounted on the overflow tube in a toilet tank. The float assembly with engaging mechanism includes a cam, a vertical round shaft, a disk cam follower, a disk-shaped float, and a float stopper on the shaft. The cam is pivotally mounted at the upper end of the vertical shaft, and it is connected to the full flush lever and partial flush lever respectively by a separate chain at a different location on the cam. The lower end of the vertical shaft is linked by a chain or the like to the top of a non-buoyant flapper valve. If the original flapper valve in a toilet tank is a buoyant one, such as the one with an air chamber under the disk-shaped valve lid, it needs to be replaced with a non-buoyant flapper valve shown in U.S. Pat. No. 5,301,373.

To activate a partial flush, depress the partial flush handle to lift the partial flush lever and rotate the cam counterclockwise by a smaller angle and lower the float at a shorter distance (than in a full flush operation) below the neutral position before flushing; as the water level drops to uncover the float, the float will follow the decreasing water level and allow the non-buoyant flapper valve to reseat and stop water flow into the toilet bowl. To activate a full flush, depress the full flush handle to lift the full flush lever and rotate the cam counterclockwise by about 90 degrees, while simultaneously pushing the float to a lower level (than in a partial flush operation); the flapper valve will therefore remain open longer to allow more water to drain into the bowl below. Note that after the completion of a full flush, the cam remains in the near vertical position, and it doesn't return to its initial near horizontal position. Consequently, this can be a serious problem when trying to activate a partial flush after a full flush actuation, because depressing the partial flush handle may not be able to jerk the cam back to its initial position to perform a successful partial flush. To install the dual flush trip lever assembly and float assembly along with the engaging mechanism, the original flush lever assembly and the buoyant flapper valve in a conventional toilet have to be replaced with those described in U.S. Pat. Nos. 5,400,445 and 5,301,373.

As another example of the Type 2 prior art, U.S. Pat. No. 4,624,018 discloses a different design of a rather complicated float assembly with engaging mechanism for a dual flushing apparatus that has a full flush handle and a partial flush handle connected separately to two concentric shafts respectively. When the partial flush handle is depressed, it rotates the connected shaft until stopped by a stop member to limit the lifting distance of the flush lever so that the opening of the flapper valve is below a threshold position beyond which the flapper valve will flip open to a fully-opened position (due to buoyancy and hydrodynamic force exerted to the valve) as in a full flush. The engaging or latching mechanism subsequently keeps the lever in the raised position until the decreasing water level uncovers the float assembly to allow the lever to drop to its initial position and the flapper valve to reseat. However, the design is rather complicated with many moving parts to make the apparatus not only expensive to manufacture but also much less reliable and durable to operate. In summary, Type 2 of the prior art generally uses complex designs such as two concentric shafts and two separate levers as in U.S. Pat. No. 5,400,445 (in contrast to a single shaft and lever design of this invention discussed hereafter). More critically, the disclosed float assemblies with engaging mechanism may not work properly, and the manufacturing cost is relatively high. However, the installation is not difficult, because there is no need to remove the toilet tank during installation.

Type 3 of the prior art provides a dual flush handle and lever assembly to replace the original flush lever assembly in a conventional single flush toilet, while using the original flush valve and overflow tube assembly. For example, U.S. Pat. No. 3,988,786 reveals a dual flush mechanism, including a full flush handle attached to a hollow shaft that is connected at the other end to a flush lever, a partial flush handle attached to a smaller concentric shaft that is inserted inside the hollow shaft and is bent at the other end to form a crank located under the same flush lever, and stopping members to limit the rotation of the flush lever and the crank. To activate a partial flush, depress and hold down the partial flush handle to partially open the flush valve below the point of buoyancy and manually control the duration of valve opening. Releasing the partial flush handle will allow the flush valve to reseat and terminate water flow while using less water than in a full flush. Depressing the full flush handle once will activate a full flush as in a conventional single flush toilet. Type 3 of the prior art is easy to install by replacing only the original flush lever assembly. However, it would take a while for the user to get used to actuating a partial flush by holding down the partial flush handle until the waste is flushed out of the toilet bowl.

Type 4 of the prior art uses partition walls to divide water in a toilet tank into two compartments for which the access to the tank draining discharge pipe is controlled by valves that are opened by a dual flush handle and lever assembly. A partial flush is activated by depressing the partial flush handle to lift and open the flush valve of a designated compartment to drain its water into the bowl below. A full flush is activated by depressing the full flush handle to open the flush valves of both compartments to drain the tank water into the bowl. For example, see U.S. Pat. No. 3,487,476. Type 4 of the prior art would have limited applications, because the partition walls for the compartments have to be custom-made to fit inside toilet tanks of various inside dimensions, which are manufacturer-dependent and also model-dependent for the same manufacturer. Furthermore, installation of the Type 4 device requires the removal of the original flush valve and overflow tube assembly, and professional plumbing skill would likely be needed.

Type 5 of the prior art uses a non-buoyant flapper valve that has no air chamber and is enhanced with a weight so that it will quickly sink to the valve seat and shut off water flow into the toilet bowl, when the depressed flush handle is released by the user. There is no threshold of valve opening beyond which the weighted non-buoyant valve would uncontrollably flip to a widely open position. The water consumption of a flush is manually controlled by the duration of holding down the flush handle. In U.S. Pat. No. 4,293,964, a weighted non-buoyant flapper valve is used to replace the original flapper valve in a conventional single flush toilet. A flush is activated by continuingly depressing the flush handle until the toilet bowl is cleared of the waste. Since it takes less water to remove the liquid waste than the solid waste from the bowl, the user will release the handle earlier and therefore only a fraction of tank water is used in flushing out the liquid waste. Type 5 of the prior art mechanisms is easy to install by replacing only the original flapper valve in a conventional single flush toilet. But it is rather inconvenient to hold down the flush handle and manually control the flush duration.

Type 6 of the prior art uses a mechanical or electric timer with a drive shaft to control the time duration for a flush valve to stay open in a partial flush or in a full flush. For example, U.S. Pat. No. 4,014,050 describes a timer-controlled, dual flush toilet apparatus that is designed for a vertically sliding bulb valve instead of the pivotally-mounted flapper valve. To activate a partial flush, depress a partial flush handle to lift the flush valve and rotate the drive shaft of the timer for approximately 22.5 degrees; after the partial handle is released, a timer-driven linkage will push downward and reseat the bulb valve in about 2.5 seconds. Similarly, a full flush is activated by depressing the full flush handle to lift the flush valve to a higher elevation and rotate the timer drive shaft for approximately 45 degrees; after releasing the full flush handle, the timer-driven linkage will reseat the bulb valve in about 5 seconds. To install the apparatus, the original flush lever assembly of a toilet tank needs to be replaced with the timer-controlled drive shaft, and the original pivotally-mounted flapper valve needs to be replaced with a vertically-sliding bulb valve. More critically, Type 6 of the prior art requires the use of a timer that is relatively expensive and introduces an unattractive appearance outside the toilet tank. However, installation is not difficult.

Type 7 of the prior art discloses a dual flush mechanism activated by two spring-loaded push buttons that are vertically mounted on the top lid of a toilet tank to operate a full flush and a partial flush respectively. Pushing either button will lift and open a vertically sliding, disk-type flush valve away from its valve seat in a cylindrical structure that also contains a float assembly. An example is given in U.S. Pat. No. 6,785,913, in which the float assembly is concentrically attached to the stem of the flush valve and is shaped like an inverted cup trapping air inside. Each push button is connected to a separate vertical rod that touches one end of a nearly horizontal lever below, and the lever is hinged at the middle with the other end linked to the valve stem. Push either button will thus depress the lever and lift the disk-type flush valve away from the valve seat to start flushing by draining tank water into the toilet bowl below. A key feature is that pushing the full flush button will lift the flush valve and the float assembly to a level where the float assembly is buoyant, while pushing the partial flush button will lift the flush valve to a lower level where the float assembly is not buoyant. As a full flush button is depressed and then released in a full flush activation, it will take a longer time (than in a partial flush activation) for the flush valve to move downward with the decreasing water level until it reseats to stop water flowing into the toilet bowl. To activate a partial flush, depress and release the partial flush button to lift the flush valve to a lower level (than in a full flush operation) where the float assembly is not buoyant, and it therefore takes less time for the flush valve to move downward and reseat than in a full flush operation. Consequently, less water is consumed in a partial flush than in a full flush.

Type 7 of the prior art is easy to operate as long as it is top mounted on the lid of a toilet tank. Since most of the existing toilets have the built-in hole on either the front wall or a side wall of the tank, the prior art mechanism described in U.S. Pat. No. 6,785,913 is not applicable and cannot be used to retrofit these toilets, not to mention that its installation would be difficult and involved with the replacement of the original flush valve and overflow tube assembly and the flush lever assembly. Although modifications may be made to allow the two spring-loaded push buttons to be horizontally mounted on either the front wall or the side wall of a toilet tank and an adapter may be added to mate with the original flapper valve seat, it would be rather inconvenient for a user to operate the modified dual flush mechanism by depressing a horizontally mounted, spring-loaded push button from most likely a standing position. A variation of Type 7 mechanisms uses a conventional flush handle instead of two push buttons; a full flush is activated by depressing the handle, while a partial flush is activated by pulling the handle upward and rotating it in other direction. But it is inconvenient for the user to pull the handle upward to activate the partial flush. In addition, there are two constraints in retrofitting a conventional single flush toilet with a Type 7 mechanism. First, the inside height of the toilet tank must be large enough to accommodate the height of the Type 7 mechanism and the existing overflow tube has to be tall enough to permit a sufficient water level in the toilet tank for partial flush to work properly. Second, finding replacement parts to repair a malfunctioned Type 7 mechanism could be a problem, unless the user is willing to replace the entire mechanism at a high cost. In contrast, replacement parts for the conventional single flush toilets are readily available, and it is rather inexpensive and easy to replace a leaking flapper valve or a flush lever assembly.

In conclusion, many prior art devices are expensive to manufacture (for example, using two concentric shafts and two flush levers, and/or complex floats with engaging mechanism), difficult to install (removing the toilet tank to replace the flush valve and overflow tube assembly), expensive to repair a leaking flush valve, unreliable to operate (due to complex designs with too many moving parts), or inconvenient to operate (pushing a spring-loaded push button installed on the toilet front or side wall, or manually controlling the duration of a flush by holding down a flush handle until completion). These deficiencies may have contributed to the fact that the overwhelming majority of the U.S. households still use the conventional single flush toilets, without the benefit of a partial flush option to reduce the unnecessary water and energy consumption.

2. Advantages of the Present Invention

The present invention provides an innovative dual flush device that uses a single shaft and a single lever to work with the original flapper flush valve. The present invention also provides an innovative float assembly that can operate either with the innovative dual flush device or with the original single flush lever assembly in a conventional toilet. Compared to the prior art mechanisms (Types 2 and 3 in particular), the innovative device and float assembly are simpler in design and inherently reliable to operate, less expensive to make, and among the easiest to install. The invention provides three choices to the user to achieve a full flush and a partial flush in a toilet while using the original flapper flush valve: (1) installing only the dual flush device; (2) installing the dual flush device and a float assembly; or (3) installing only a float assembly (while using the original single flush lever assembly). The only hardware that needs to be replaced in a conventional single flush toilet is the flush lever assembly for the first two choices and none for the third choice. Installation of any of the three choices can be readily made by homeowners without hiring a professional plumber.

SUMMARY OF THE INVENTION

The present invention is a dual flush device and a float assembly for use in a toilet tank. The dual flush device is one of the several embodiments of the invention. It is mountable through a built-in hole in a toilet tank wall. As a non-limiting example, it comprises a first flush handle with a thinner extension formed by a cutout at the top, a shaft fastened to the knob of the first flush handle (preferably built as a unit), a stop member limiting the rotation of the first flush handle and the shaft, a second flush handle assembly partially enclosed in a housing that also serves as a stop member limiting rotation of the second flush handle, a shaft housing that has a square head followed by a threaded section and is hollow in the center to allow insertion and free rotation of the shaft, a hand-tightening nut mounted over the threaded section of the shaft housing (to attach it to the toilet tank wall during installation), and a flush lever fixed to the end of the shaft. The further end of the lever has several holes, and it is connected by a chain to the original flapper flush valve in the toilet tank. Several members are preferably integrally built as a single unit that includes the first flush handle stop member, the housing for the second flush handle assembly, and the shaft housing. The entire device is vertically supported by the tank wall and axially restrained from movement by the nut fastened to the tank wall.

The second flush handle assembly is preferably built as a single unit, which comprises a second flush handle with a thinner transverse end section formed by a cutout at the bottom to overlap over the thinner extension of the first flush handle, a hub extension connecting the other end of the second flush handle to a hub, and the hub with a circular hole in the center somewhat larger than the shaft to allow free rotation of the shaft after its insertion. The housing of the second flush handle assembly comprises a stop member, approximately resembling a letter "C" with a wide opening on one side to allow lateral insertion of the hub of the handle assembly, and two end members to form an enclosure. Both end members have a circular hole in the center somewhat larger than the shaft to allow free rotation of the inserted shaft. Before the shaft is install, the second handle assembly is laterally inserted into the housing so that the central hole of its hub aligns with the central holes of the housing end members. The second flush handle assembly is supported by the inserted shaft and by the overlapped portion of the first flush handle. Since the shaft is smaller than the circular holes of the second flush handle hub and housing, the inserted shaft is allowed to rotate freely when the first flush handle is depressed by the user to activate a flush. When the second flush handle is depressed by the user, it depresses the first flush handle (via the overlapped end section) to rotate the shaft, lift the flush lever, and open the flapper valve. Rotation of the second flush handle is limited by the upper surface (for upward rotation) and lower surface (for downward rotation) of the opening of the C-shaped stop member.

An adjustable screw is installed through a threaded hole on the hub extension of the second flush handle assembly. The length of the screw projected below the hub extension further restricts downward rotation of the second flush handle and is adjustable to accommodate any potential variations in the toilets made by different manufacturers or among different models made by a manufacturer. The downward rotation of the second flush handle is stopped when the tip of the screw (or the lower surface of the second flush handle assembly if there is no screw) contacts the lower surface of the C-shaped stop member to ensure that the opening of the flapper valve is below the threshold, beyond which the flapper valve will flip to a widely open position due to valve buoyancy and hydrodynamic force of the flowing water. When the dual flush device of the present invention is used in a stand-alone mode without the installation of the float assembly, a full flush is activated by depressing the first flush handle, and a partial flush is activated by holding down the second flush handle until flushing completion. After the second flush handle is released, the flush lever falls back to its normal pre-flush position and the flapper valve drops on top of the valve seat and terminates water flow to the toilet bowl below.

In another embodiment of the invention, a float assembly is disclosed and it is installed on the overflow tube. When activated, it will prematurely close the flapper valve. Note that when the float assembly is installed with the aforementioned dual flush device, the screw on the second flush handle assembly is either removed or raised to have no projection below the hub extension to increase the downward rotation of the second flush handle to allow the flapper valve to flip to a widely-open position (as in a convention full flushing toilet). A simpler flush handle assembly is disclosed in another embodiment of the invention that has no screw nor the mating threaded hole, and it can also be used with the float assembly.

The float assembly includes a vertically sliding float, a mounting structure that has a hollow double-wall shell to mate with the upper wall of the toilet overflow tube and anchors a vertical bar to be inserted into the float as a guide along with the float rising or falling according to the water level in the toilet tank, and an asymmetric, approximately flat disk with one side heavier than the other side. The disk hangs on a pivot located near the top of the mounting structure and it has a projection on the lighter side to engage a cutout on the bottom of the float (to prevent it from descending with the decreasing water level). The pivotally mounted disk has an eyelet on top of the heavier side (opposite to the projection) that is loosely connected to the flush lever with a slack in a chain. Depressing the first flush handle will overcome the slack in the chain and rotate the projection of the disk away from the float, while depressing the second flush handle will not overcome the slack in the chain so that the float will be kept in place by the disk.

When both the dual flush device and float assembly of the present invention are installed in a toilet, a full flush is activated by depressing the second flush handle (without holding down the handle) to widely open the flapper valve while the disk keeps the float in place as the tank water level decreases. A partial flush is activated by depressing the first flush handle (without holding down the handle) to widely open the flapper valve and rotate the disk to disengage the float; when the float is partially uncovered by the decreasing water level, it falls with the decreasing water level and prematurely closes the flapper valve to terminate water flow into the toilet bowl. As a result, a partial flush uses only a fraction of the water of a conventional full flush. Note that the role of the first flush handle and second flush handle is reversed when the float assembly is in use with the dual flush device.

In another embodiment of the invention, a float assembly is disclosed in which the aforementioned disk and the chain linked to the flush lever are removed to allow free movement of the float. The float assembly is mounted on the overflow tube in a toilet tank to work with the original single flush lever assembly and flapper valve. There is no replacement of any hardware in a toilet. Depress the flush handle (without holding the handle) to activate a water-saving partial flush. If some waste still remains in the toilet bowl after a partial flush, the user can hold down the flush handle until the bowl is completely clean. Alternatively, the user can hold down the flush handle to activate a full flush without going through a partial flush first. In another embodiment, a float assembly with an adjustable vertical length is disclosed, and it has a lower head that can be vertically lowered or raised along a screw or threaded rod in the float. Within a limit, increasing the vertical length of the adjustable float will generally consume less water in a partial flush by closing the flapper valve earlier, while decreasing the vertical float length will generally consume more water in a partial flush. There are two advantages in using an adjustable float: (1) it enables the user to select the optimum amount of water in a partial flush to clean the toilet; and (2) it can accommodate some differences in various toilets and has more applications.

The invention has three objects: (1) provide several embodiments to reduce water usage that can be used to easily and inexpensively retrofit the conventional single flush toilets; (2) create three implementation choices for the user; and (3) make external operation and appearance of the embodiments similar to what is in the conventional single flush toilets. The objects and advantages of the present invention will become apparent from the detailed description of the invention and the accompanying drawings. And, they do not necessarily represent the full scope of the invention, which may be employed in other embodiments and covered in the claims of the invention.

BRIEF DESCRIPTION OF THE DRAWINGS

FIG. 9 is a perspective, exploded view of an embodiment of a second flush handle assembly and its housing;

FIG. 10 is an enlarged, perspective view of the embodiment of the second flush handle assembly of FIG. 9;

FIG. 11 is an enlarged, perspective view of another embodiment of the second flush handle assembly;

FIG. 12 is an enlarged, perspective view of a further embodiment of the second flush handle assembly;

FIG. 14 is a front elevation view of an embodiment of a float assembly of the present invention;

FIG. 15 is a perspective view of the mounting structure of the float assembly of FIG. 14;

FIG. 16 is a cross-sectional view of the mounting structure taken along line A-A in FIG. 15;

DETAILED DESCRIPTION OF THE PREFERRED EMBODIMENTS

The present invention provides a dual flush device 1 and a float assembly 73 or 76 for use in a toilet tank 16.

Figure 1:
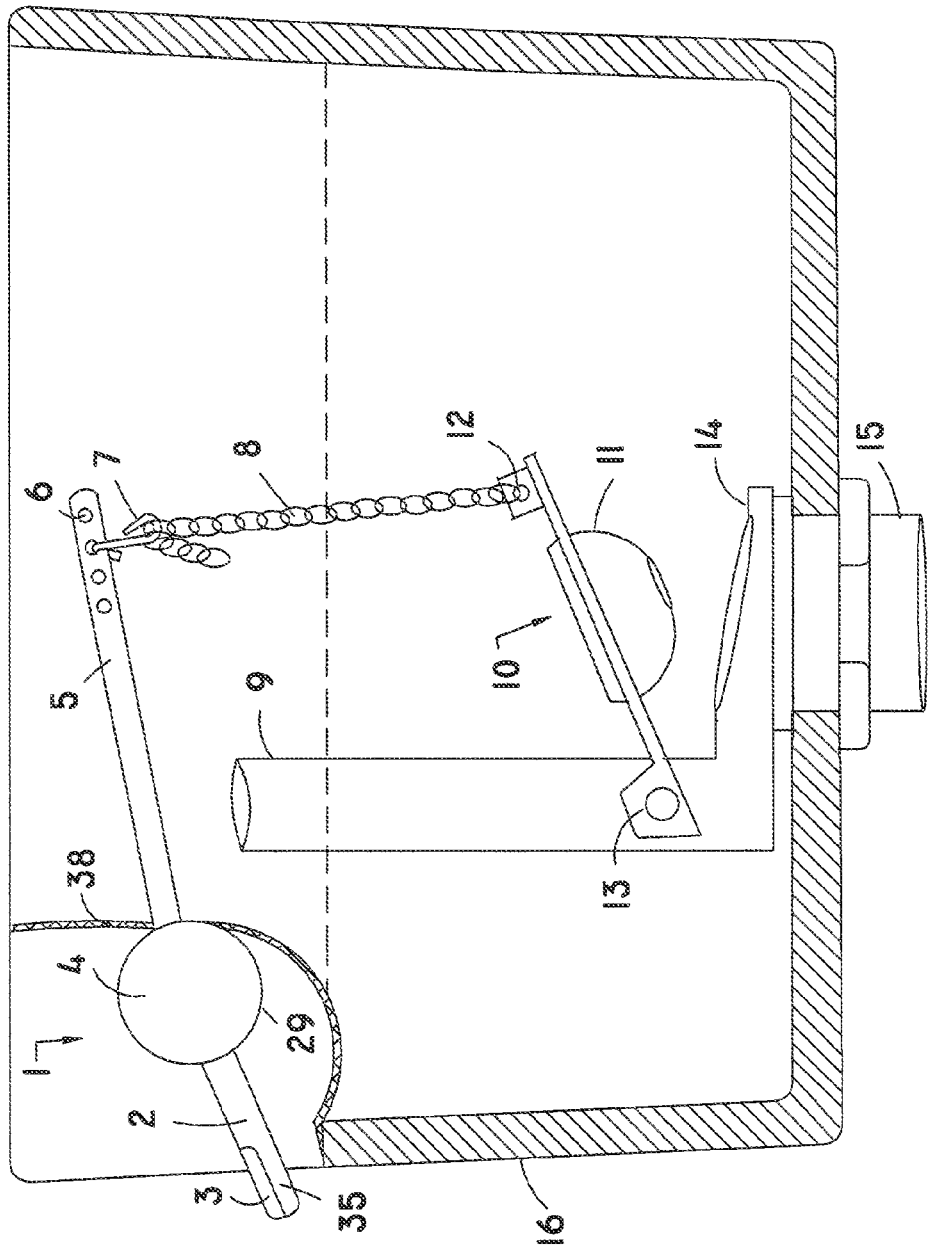
FIG. 1 is a front elevation view of a toilet tank showing a dual flush device of the present invention, in an activated position that lifts to open a pivotally-mounted flapper flush valve.
Figure 2:
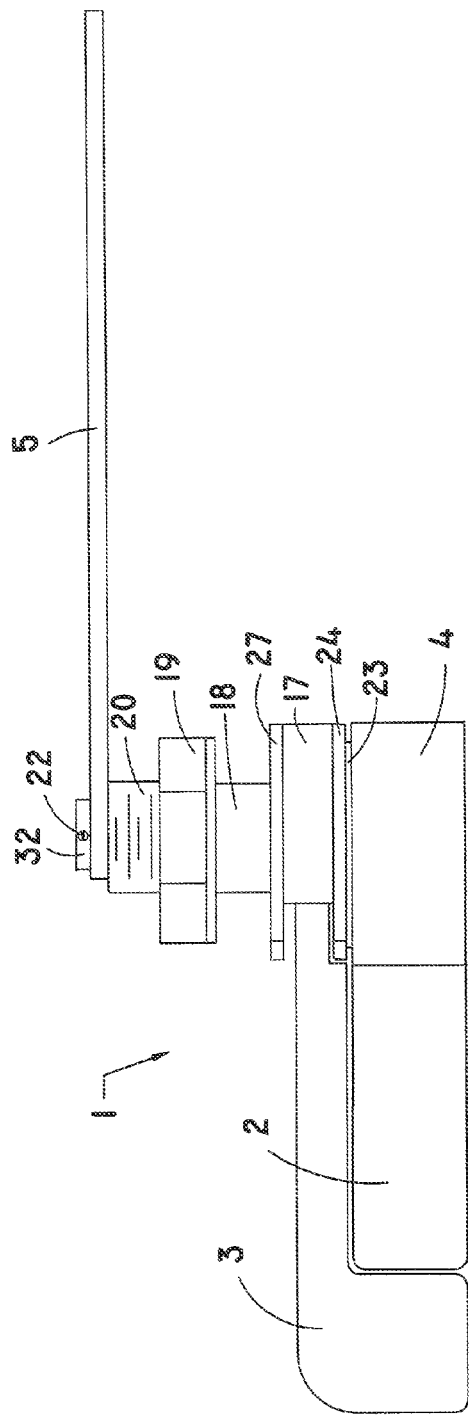
FIG. 2 is a top view of the dual flush device, in the neutral position (with the length of a flush lever shortened for illustration)
Figure 3:
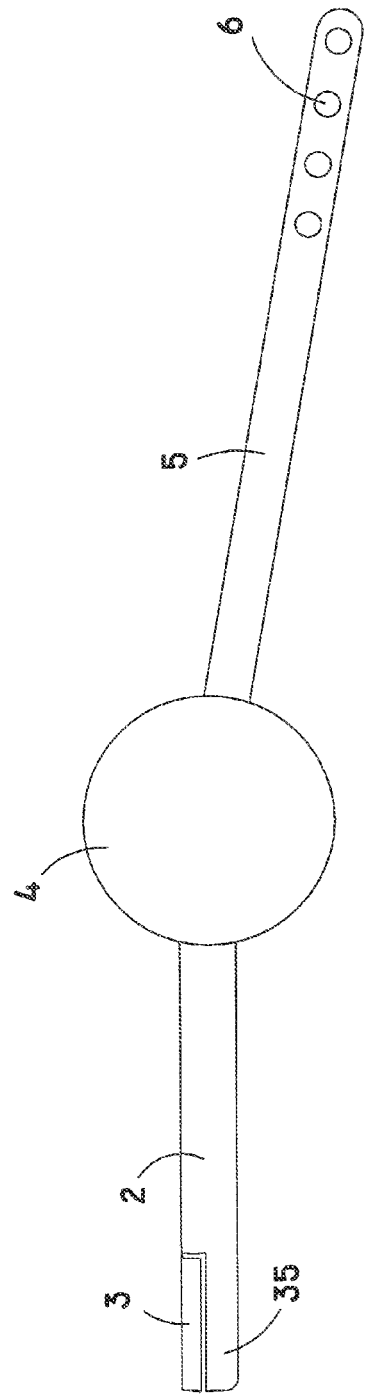
FIG. 3 is a front elevation view of the dual flush device of FIG. 2.

In FIG. 1, an embodiment of dual flush device 1 of the present invention has been installed in a toilet tank 16 through a built-in hole 29 on the front wall of tank 16 behind a flush handle knob 4. It replaces the original flush lever assembly to retrofit a conventional single flush toilet to a dual flush toilet. The dual flush device 1 is shown in an activated position when a first flush handle 2 is depressed to lift flush lever 5 and open a flapper flush valve 10. Inside toilet tank 16, there are flapper valve 10, which is connected at an eyelet 12 by a chain 8 to flush lever 5 of dual flush device 1 and is pivotally mounted on two opposite projections 13 on an overflow tube 9, and an inclined flush valve seat 14 to mate with flapper valve 10. Connected to valve seat 14 is a discharge pipe 15 into which the tank water is drained into a toilet bowl (not shown). Flapper valve 10 in FIG. 1 has a hemi-spherical air chamber 11 at the lower end to help trap air inside and make the valve buoyant in water. An inlet valve assembly controlling water flow into the tank is purposely omitted in FIG. 1 to avoid cluttering the illustration, since it has no impact to embodiments of the present invention.

Figure 4:
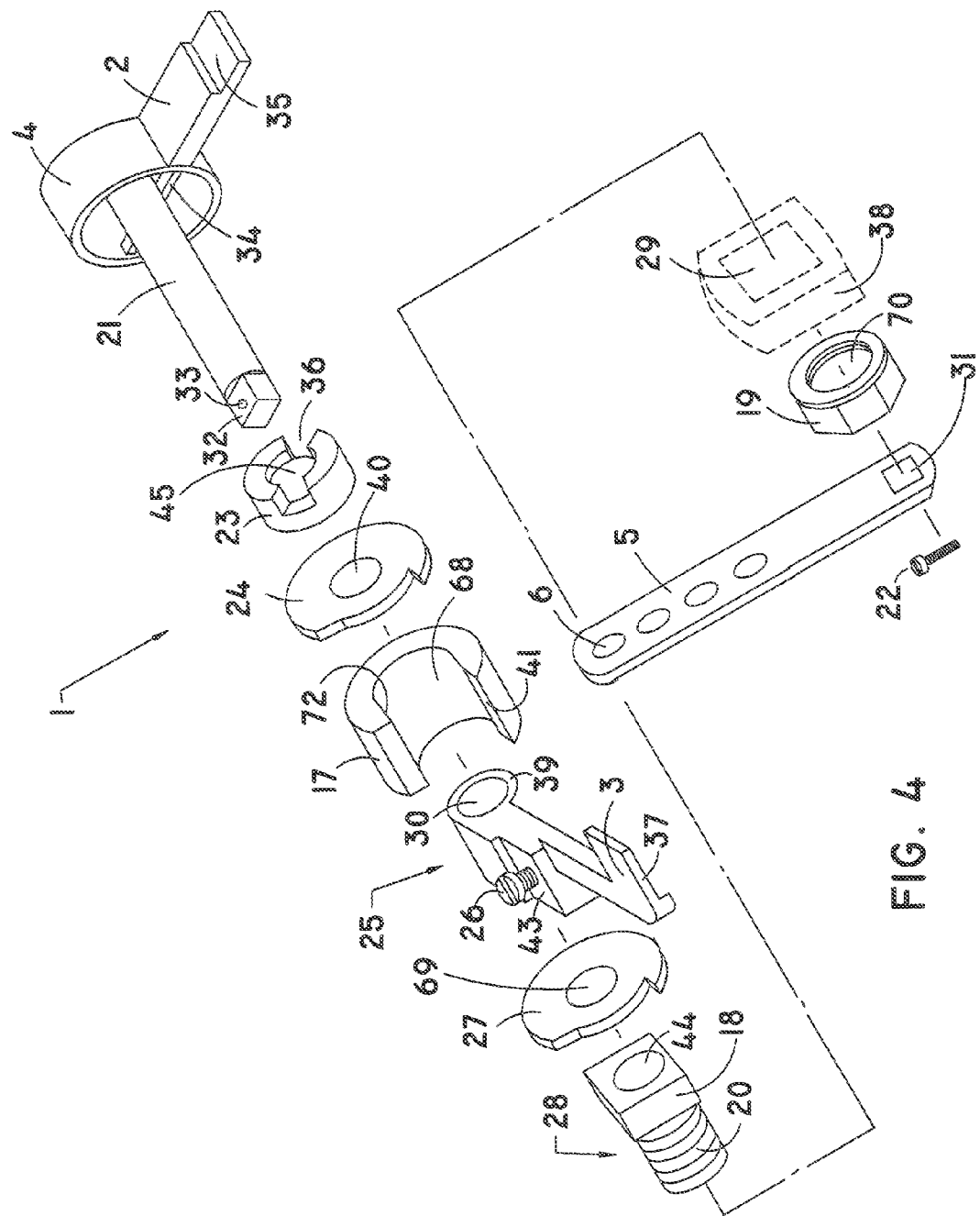
FIG. 4 is a perspective, exploded view of the dual flush device of the present invention.

In FIGS. 1-10 and especially in FIG. 4, an embodiment of dual flush device 1 comprises a first flush handle 2 that has a thinner extension 35 (with a cutout at top), a knob 4 of first flush handle 2 that is fixed to a rotation shaft 21, a stop member 23 for limiting the rotation of first flush handle 2 and shaft 21, a second flush handle 3 approximately shaped like a letter "L" that has a thinner extension 37 (with a cutout at bottom) to overlap and rest on top of extension 35 of first flush handle 2, two identical end members 24 and 27 enclosing a generally C-shaped stop member 17 to form a housing for second flush handle 3, a second flush handle assembly 25 that comprises second flush handle 3, a hub 39 and a hub extension 43 with a top-mounted adjustable screw 26, a shaft housing 28 that has a square head 18 (to be inserted inside the built-in hole 29 of a tank wall 38) followed by a screw threaded body 20, a hand-tightening nut 19 (with an internal thread to engage threaded body 20 of shaft housing 28), a flush lever 5 that has a preferably rectangular hole 31 at one end (to engage a rectangular end section 32 of shaft 21) and several holes 6 on other end, a hook 7 attached to a hole 6 on lever 5 to support chain 8 that links flapper valve 10 to lever 5, and an end screw 22 (or a cotter pin or the like) to secure flush lever 5 to shaft 21 by engaging a threaded hole 33 near the tip of shaft 21.

Figure 5:
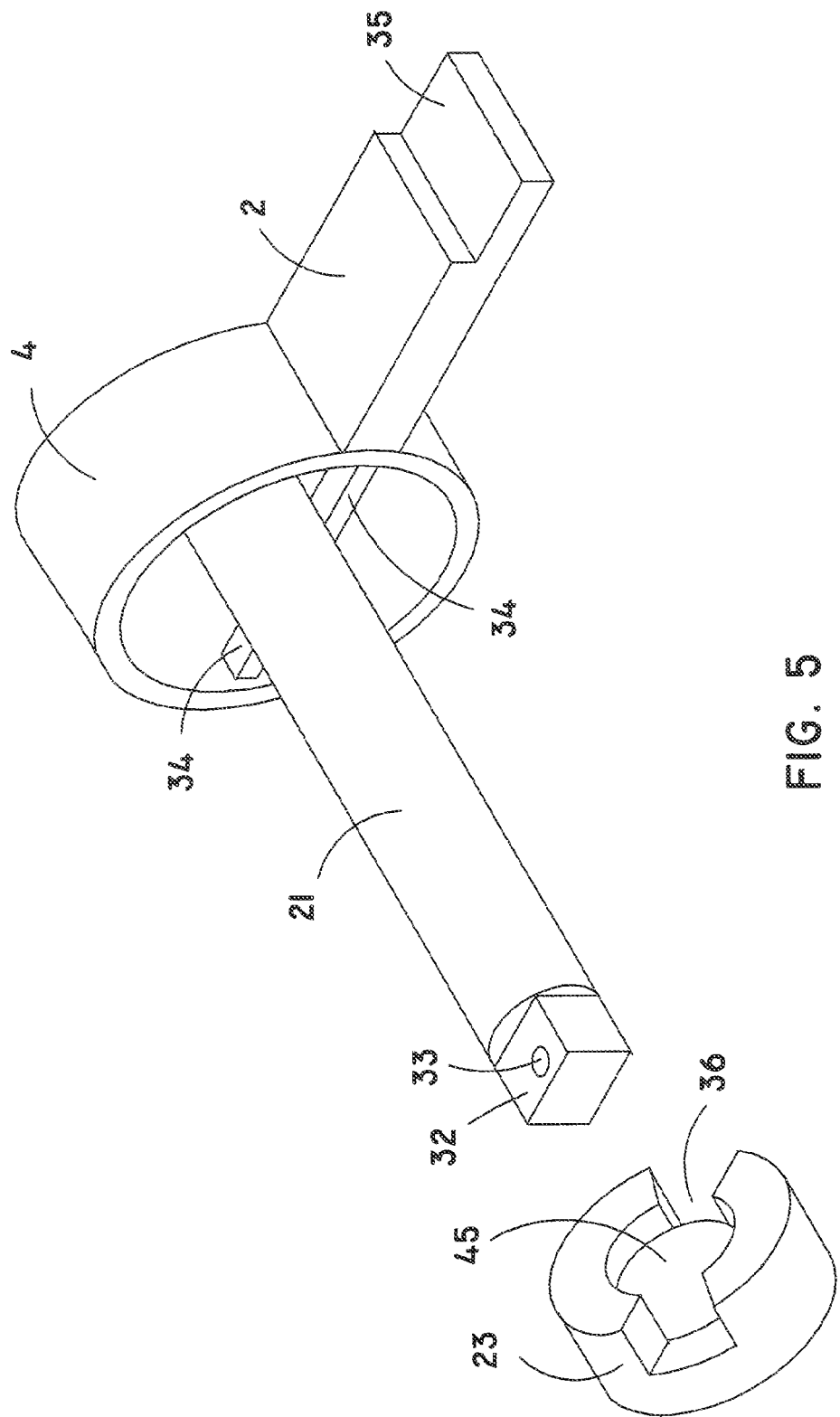
FIG. 5 is a perspective view of a first flush handle with a round shaft and a stop member (for limiting first flush handle and shaft rotation)
Figure 6:
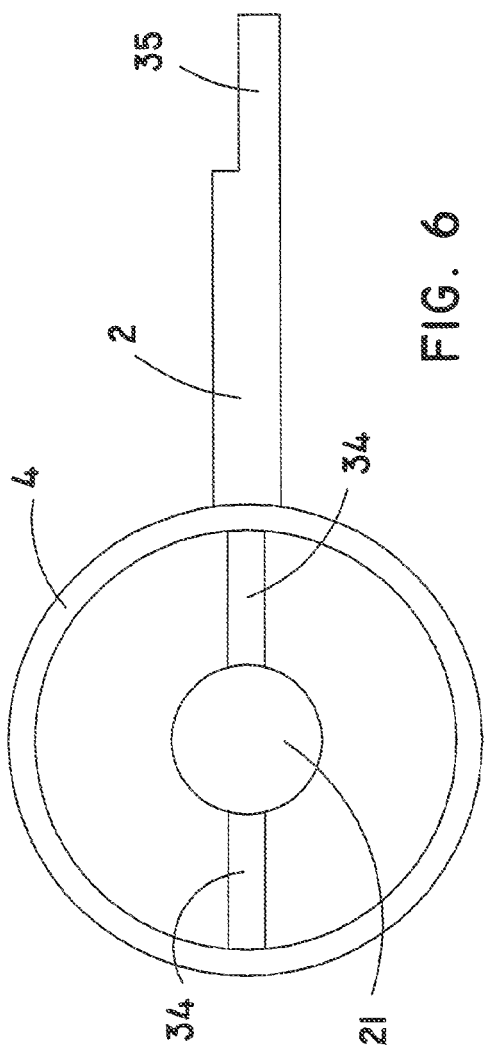
FIG. 6 is an elevation view of the first flush handle of FIG. 5.
Figure 7:
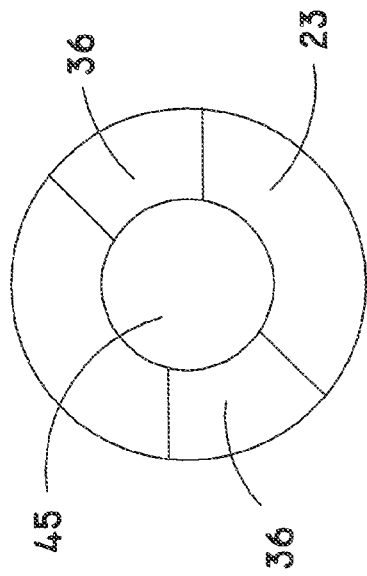
FIG. 7 is an additional perspective view of the stop member of FIG. 5.
Figure 8:
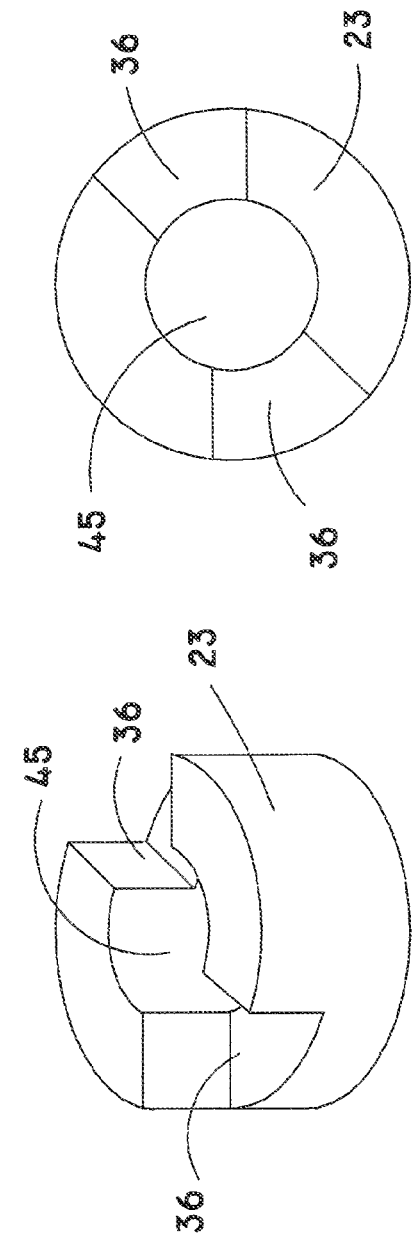
FIG. 8 is a top view of the stop member of FIG. 7.
Figure 19:
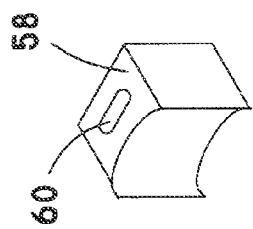
FIG. 19 is a perspective view of an embodiment of the lower support structure for the vertical bar of FIGS. 14 and 17.

In FIGS. 4 and 5, shaft 21 and first flush handle 2 with knob 4 are preferably built as a single unit. Alternatively, shaft 21 can be manufactured as a separate piece and is attached to knob 4 of first handle 2 by a proper arrangement. Components 23, 24, 17, 27, and 28 are built as a single unit identified as integral shaft housing unit, and they are shown in FIG. 4 as individual pieces merely for illustration. Hub 39 of second flush handle assembly 25 is inserted inside C-shaped stop member 17 before being inserted with shaft 21. Several components shown in FIG. 4 have a smooth circular opening of preferably the same diameter that is slightly larger than shaft 21 to allow insertion and free rotation of shaft 21: they include stop member 23 with a hole 45, end members 24 with a hole 40 in the center, second flush handle assembly 25 with a hole 30, end member 27 with a hole 69, and shaft housing 28 with a hole 44. Stop member 17 has a larger opening 68 to accommodate hub 39 of second flush handle assembly 25. For installation, hub 39 of second flush handle assembly 25 is inserted inside stop member 17 of the integral shaft housing unit, before shaft 21 is inserted and lever 5 is attached to shaft 21 with end screw 22. The assembled device is then inserted through the hole on the toilet tank wall, and nut 19 is then mounted around the further end of lever 5 and tightened over threaded body 20 against the tank wall.

The embodiment of dual flush device 1 shown in FIGS. 1-4 has a straight flush lever 5 that is suitable for installing on the front wall of a toilet tank 16. However, it can be easily modified for installing on a side wall of toilet tank 16 by merely replacing straight lever 5 with a bent one to fit nicely inside tank 16 to lift flapper valve 10. As shown in FIG. 4, nut 19 has an internally threaded opening 70 to mate with external thread 20 of shaft housing 28. In FIGS. 4-8, stop member 23 is a short hollow cylinder with two identical cutouts 36 that are circumferentially 180-degree apart, and they engage spokes 34 inside knob 4 of first flush handle 2 to limit the rotation of shaft 21 and first flush handle 2. When first flush handle 2 is depressed and rotated downward by approximately 40 to 50 degrees, or by an angle large enough so that flapper valve 10 flips fully open due to valve buoyancy and hydrodynamic force of flowing water around flapper valve 10, spokes 34 come into contact with the other side of cutouts 36 so that further rotation of shaft 21 is stopped while flapper valve 10 is widely opened to allow tank water draining into the toilet bowl below.

Figure 13:
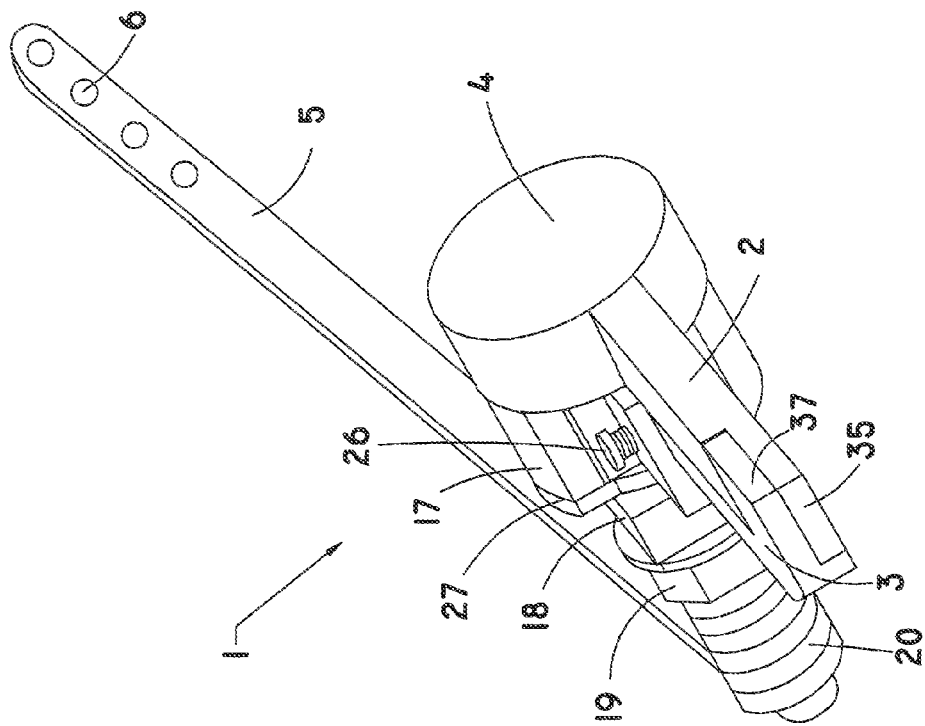
FIG. 13 is a perspective view of the dual flush device of the present invention as an assembled unit.

FIG. 9 shows an embodiment of second flush handle assembly 25 surrounded by an exploded view of its housing, including a generally C-shaped stop member 17 and end members 24 and 27. Second flush handle assembly 25 is loosely mounted around shaft 21, and it indirectly rotates shaft 21 and opens flapper valve 10 by depressing first flush handle 2 through the overlap of second flush handle extension 37 and first flush handle extension 35 as shown in FIGS. 1-4. A lower surface 41 of C-shaped stop member 17 limits downward rotation, and an upper surface 72 limits upward rotation of second flush handle assembly 25. A screw 26 is installed through a threaded hole 71 on hub extension 43 of second flush handle assembly 25, and the length of a screw projection 42 below hub extension 43 is adjustable to further restrict the rotation of second flush handle assembly 25 whenever necessary; a purpose is to accommodate any potential variations in the toilets made by different manufacturers or among different models made by the same manufacturer. FIG. 10 shows an enlarged, perspective view of the embodiment of second flush handle assembly 25 in FIG. 9. FIG. 11 shows another embodiment of second flush handle assembly 25, which is similar to the embodiment of second flush handle assembly 25 in FIGS. 9 and 10 but that an end cap 46 is mounted at the lower end of screw 26 to increase contact area (between the end of screw 26 and lower surface 41 of stop member 17) and reduce wear and tear. FIG. 12 shows a further embodiment of second flush handle assembly 25 in which hub extension 43A does not have a matching threaded hole to mate with a screw. FIG. 13 shows an embodiment of assembled dual flush device 1.

FIG. 14 shows a front elevation view of an embodiment of a float assembly 73, which comprises a float 49, a mounting structure 47, a vertical bar 50 with a top head 51 larger than the main body of vertical bar 50, and a pivotally-mounted approximately flat disk 48. Float 49 has an average density somewhat less than the density of water to remain afloat in water, and it is allowed to slide freely along vertical bar 50 when activated. FIG. 15 shows a perspective view of an embodiment of mounting structure 47 to mount over the widely-used cylindrical overflow tubes in conventional toilets. FIG. 16 shows a cross-sectional view of mounting structure 47 taken along line A-A in FIG. 15, and mounting structure 47 has a hollow double-wall shell with a gap 62 between the outer and inner walls to mate with the upper wall of overflow tube 9 (in toilet tank 16 in FIG. 1). A central opening 63 preserves the function of overflow tube 9 by allowing any water above overflow tube 9 to freely drain into overflow tube 9. On top of mounting structure 47, there are a few optional notches 61 (with the outer wall removed to expose the inner wall) to be attached with a fastener or the like to help prevent any axial or lateral movement of float assembly 73 (or float assembly 76 in FIG. 22), if needed. However, it is preferred to have gap 62 at a right size to fit over the overflow tube wall to prevent any axial or lateral movement of float assembly 73. On top of mounting structure 47, there is a refill tube holder 78 shown in FIG. 15, which is to be inserted with the refill tube (not shown) from the inlet valve assembly to add water to the toilet bowl through overflow tube 9. Furthermore, if any non-cylindrical overflow tube such as a rectangular one is already installed in toilet tank 16, mounting structure 47 in FIGS. 15 and 16 can be replaced with a rectangular double-wall shell to mate with the rectangular overflow tube.

Figure 17:
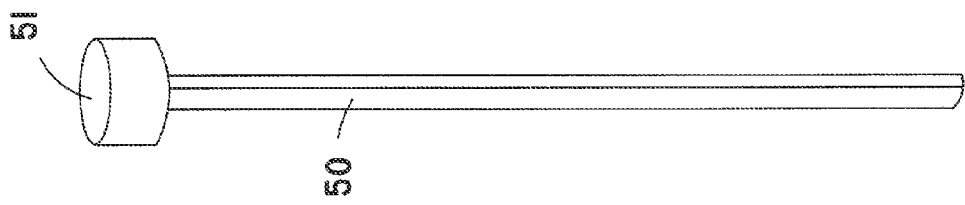
FIG. 17 is a perspective view of an embodiment of the vertical bar (for guiding float movement) of FIG. 14.
Figure 23:
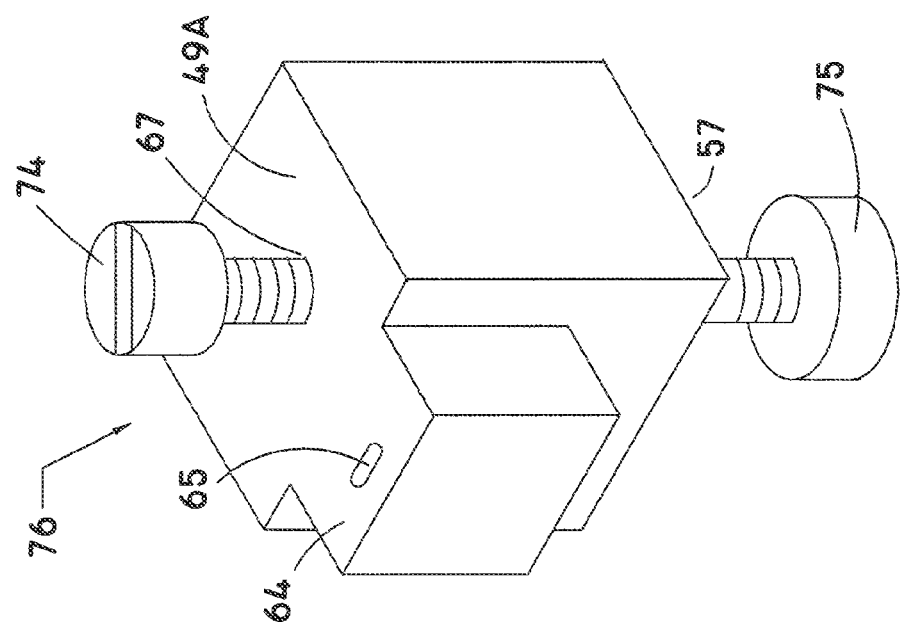
FIG. 23 is a perspective view of the float of FIG. 22.
Figure 18:
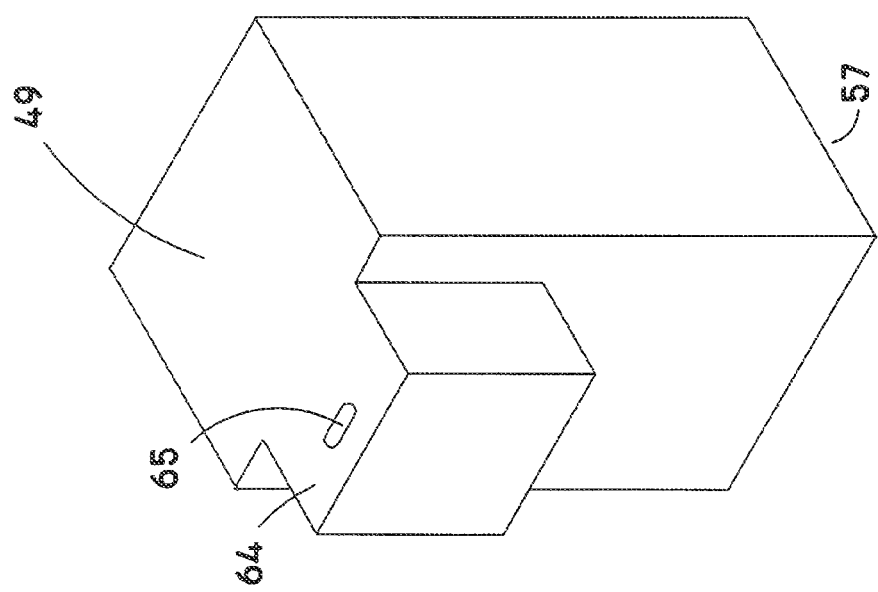
FIG. 18 is a perspective view of an embodiment of the float of FIGS. 14 and 21.

FIGS. 14, 15, 19, 21 and 22 show that mounting structure 47 has a top protruding section 52 with a hole 59 to be inserted with vertical bar 50 and a bottom protruding section 58 with a shallow hole 60 (partially penetrating into section 58). Top head 51 of vertical bar 50 rests on the upper surface of top protruding section 52 of mounting structure 47, and the lower end of bar 50 anchors inside bottom protruding section 58. FIG. 17 shows an embodiment of vertical bar 50 that has preferably a rectangular cross section with smooth corners (or any other smooth cross sections) that can inhibit lateral rotation of float 49 in FIGS. 14 and 21 or float 49A in FIG. 22. Vertical bar 50 is inserted into a slightly larger matching hole 65 in a projected section 64 on float 49 in FIG. 18 or on float 49A in FIG. 23 (which is another embodiment of float 49) to guide the vertical movement of float 49 or 49A while preventing any lateral rotation. Mounting structure 47 also serves as a stop member to confine the vertical movement of float 49 or 49A between top protruding section 52 and bottom protruding section 58. In FIGS. 18 and 23, floats 49 and 49A have respectively a rectangular-shaped main body (or any other shape whenever fit) with a lower surface 57.

In FIGS. 14-16 and 20, an embodiment of flat disk 48 has a round hole 54 near the top to pivotally mount on a round lug 53 on mounting structure 47 that has an upward projection 77 at entrance to prevent the flat disk 48 from being detached after the mounting. Flat disk 48 has preferably a uniform thickness on the right side of hole 54 in FIG. 14 and another uniform thickness on the left side of hole 54 (which can be thicker than the right side if needed); hole 54 is somewhat larger than the diameter of lug 53 to allow free pivotal rotation of flat disk 48. Flat disk 48 has a lower projection 56 on one side to engage lower surface 57 of float 49 or 49A in FIGS. 14, 18, and 23 and it keeps float 49 or 49A in place when not activated. As shown in FIG. 14, flat disk 48 is asymmetric with respect to hole 54 when pivotally mounted on lug 53 of mounting structure 47, and its left side is heavier than the right side and produces a net torque to keep lower projection 56 engaging lower surface 57 of float 49 or 49A. Consequently, float 49 or 49A is kept in place (deactivated) when the tank water level decreases to uncover float 49 or 49A and remove its buoyancy as in a full flush operation.

Figure 20:
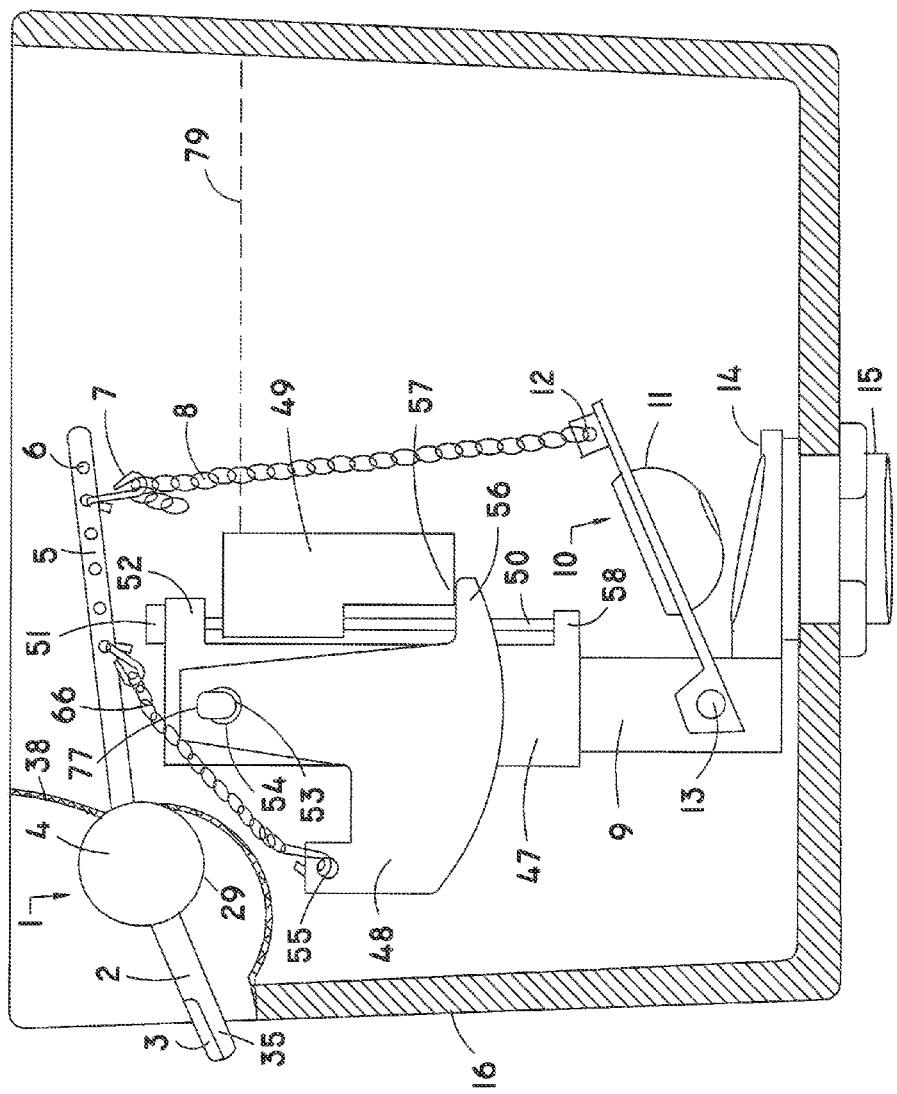
FIG. 20 is a front elevation view of a toilet tank showing the dual flush device and an embodiment of the float assembly (with an opened flapper valve and the float in a deactivated position)

In FIGS. 14 and 20, flat disk 48 has an eyelet 55 on the left side to be linked by a chain 66 to flush lever 5. When flat disk 48 is at the neutral, deactivated position before a toilet flush, it keeps float 49 (or 49A) in place and chain 66 is loosely connected to flush lever 5 with an intentional slack. FIG. 20 shows that a raised flush lever 5 has just removed the slack in chain 66 with a tank water level 79. Further raising lever 5 will lift the left side of flat disk 48 to clockwise rotate flat disk 48 and disengage projection 56 from float 49 (or 49A). Float 49 or 49A will move downward with the decreasing tank water level, come into contact with the opened flapper valve 10, and prematurely close flapper valve 10 before tank 16 is near empty. As a result, only a fraction of toilet tank water is consumed when flat disk 48 is lifted or activated by chain 66 to allow float 49 or 49A to descend with the water level as in a partial flush. During tank refill after flapper valve 10 is closed, float 49 or 49A will move upward with the rising water level and will not rise beyond top protruding section 52 of mounting structure 47.

In FIG. 20, float assembly 73 of FIG. 14 is used complimentarily with dual flush device 1 of FIG. 4 except that screw 26 is removed (or raised to have no projection below handle 3) from second flush handle assembly 25. Alternatively, second flush handle assembly 25 in FIG. 4 is replaced with another embodiment shown in FIG. 12 (in which the hub extension without a threaded hole is designated as 43A as opposed to hub extension 43 with a threaded hole in FIGS. 9-11). The reason to remove screw 26 is to allow a greater rotation of shaft 21, when second flush handle 3 is depressed without the protruding of screw 26 below hub extension 43. Consequently, flush lever 5 is raised higher to be able to open flapper valve 10 beyond the threshold where flapper valve 10 will flip to a widely open position. However, depressing second flush handle 3 cannot overcome the slack in chain 66 so that float 49 (or 49A that is not shown but implied in FIG. 20) will be kept in place by flat disk 48. Depressing first flush handle 2 will not only open flapper valve 10 beyond the threshold but also effectively overcome the slack in chain 66 and clockwise rotate flat disk 48 to disengage float 49 (or 49A of FIG. 23) to allow it to descend with the falling water level in the toilet tank.

Therefore, a partial flush is activated by depressing first flush handle 2 (without holding down the handle) to widely open flapper valve 10 and clockwise rotate flat disk 48 to disengage float 49 or 49A. When float 49 or 49A is partially uncovered by the falling water level, float 49 or 49A will descend with the water level and prematurely close flapper valve 10 to terminate water flow into the toilet bowl. A full flush is activated by depressing second flush handle 3 (without holding down the handle) to widely open flapper valve 10, while flat disk 48 is not clockwise rotated and keeps float 49 or 49A in place as water level drops in the toilet tank.

Figure 22:
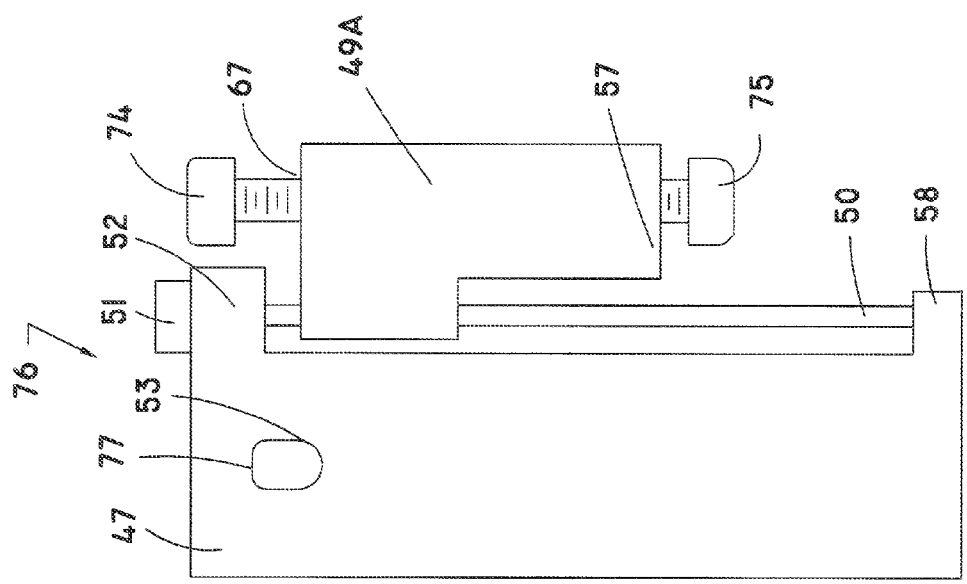
FIG. 22 is a front elevation view of another embodiment of the float assembly, similar to the embodiment of FIG. 21 but that the vertical length of the float is adjustable.
Figure 21:
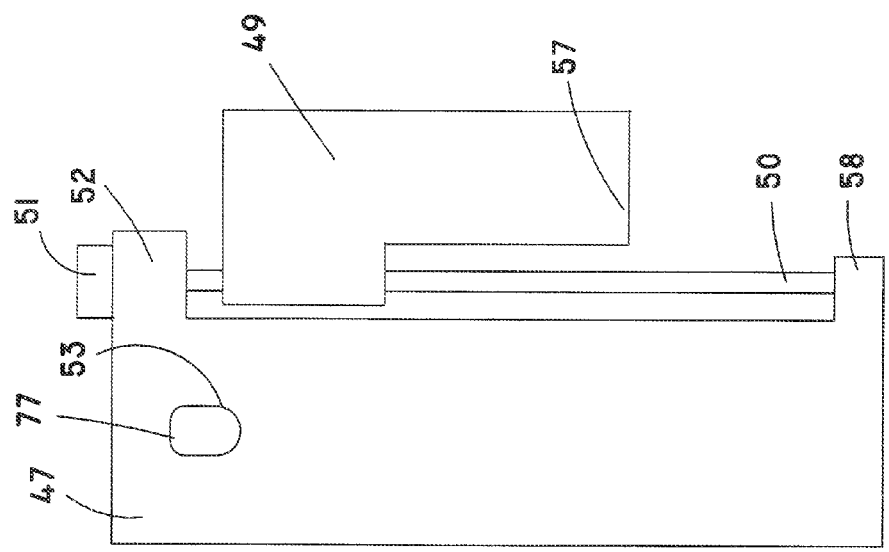
FIG. 21 is a front elevation view of the float assembly of FIG. 14 with the pivotally-mounted flat disk removed to allow free movement of the float.

Float assembly 73 with flat disk 48 removed as shown in FIG. 21 can be used as a stand-alone component to reduce water consumption in a conventional single flush toilet, without the installation of dual flush device 1 of FIG. 4. Without the presence of flat disk 48, float 49 will move freely downward with the falling water level in the toilet tank until it is constrained by bottom protruding section 58 of mounting structure 47. FIG. 22 shows another embodiment of the float assembly, designated as float assembly 76, and a perspective view of float 49A is shown in FIG. 23. Float assembly 76 is similar to the embodiment shown in FIG. 21 but the vertical length of float 49A is adjustable by turning a screw or threaded rod 74 inside a threaded hole 67 in float 49A. Lower end of screw 74 has a cap 75 larger than the body of screw 74 as shown in FIG. 23, and its position can be easily lowered by clockwise turning screw 74 or raised by counterclockwise turning screw 74. Either float assembly 73 with flat disk 48 removed in FIG. 21 or float assembly 76 in FIG. 22 can be mounted on overflow tube 9 (FIG. 1) to work with the original single flush lever assembly and flapper valve in a conventional toilet without any hardware replacement. Note that the azimuthal location of vertical bar 50 and top protruding section 52 and bottom protruding section 58 of mounting structure 47 can be made different to what is shown in FIGS. 14, 20, 21 and 22, whenever necessary to accommodate various toilet tanks. When the user depresses the single flush handle to fully open the flapper valve, float 49 or 49A will move downward with the decreasing water level in the toilet tank to prematurely close the flapper valve before the tank is near empty. If more water is needed to remove a heavy load of solid waste in the toilet bowl, the user can hold down the flush handle until all the waste is removed. Note that for the conventional toilets in the United States and possibly elsewhere in which siphon is used to help remove the waste from the toilet bowl, a partial flush can be made powerful enough to remove not only the liquid waste but also the solid waste while using less than a full tank of flushable water. If some waste still remains in the toilet bowl after a partial flush, the user can hold down the flush handle until the bowl is completely clean. Alternatively, the user can hold down the flush handle to activate a full flush without going through a partial flush first.

As stated earlier, float 49A in FIGS. 22 and 23 has an adjustable vertical length. Tests conducted using a prototype of float assembly 76 in a toilet show that within the operating limit, increasing the vertical length of adjustable float 49A will generally consume less water in a partial flush by closing the flapper valve earlier, while decreasing the vertical float length will generally consume more water in a partial flush. Therefore, float assembly 76 with adjustable float 49A in FIG. 22 can be used to enable the user to select an optimum amount of water consumption in a partial flush in the toilet. Since the vertical length of float 49A is adjustable, it can accommodate some differences in various toilets in terms of overflow tube length or the initial tank water level before a flush activation.

It is rather easy to install the aforementioned dual flush device 1 and/or float assembly 73 or 76 to convert a conventional single flush toilet to a dual flush toilet.

It is to be understood that the present invention is not limited to the embodiments described above or as shown in the attached figures, but encompasses any and all embodiments within the spirit of the invention.

What is claimed is:

1. A dual flush device being mountable through a mounting hole in a wall of a toilet tank and comprising two overlapping flush handles to rotate a single rotational shaft and control a single flush lever in the tank to allow a user to selectively activate either a full flush or a partial flush using a volume of water less than a volume of water used in said full flush, said dual flush device comprising:
a single rotational shaft being rotatably supported in the mounting hole, wherein said shaft is adapted for being rotated from an initial position to a full flush position and returning to said initial position from said full flush position, and wherein said shaft is adapted for being rotated from said initial position to a partial flush position and returning to said initial position from said partial flush position;
a first flush handle being fastened to said shaft and downward rotated by the user to rotate said shaft;
a first stop member being positioned inside a hub of said first flush handle to limit the rotation of said first flush handle and said shaft;
a second flush handle assembly being loosely inserted with said shaft, wherein said second flush handle assembly comprises a second flush handle having a transverse extension to overlap and rest on top of an extension of said first flush handle, wherein said second flush handle assembly is activated by the user to downward rotate said second flush handle to downward rotate said first flush handle to rotate said shaft, wherein said second flush handle assembly further comprises a hollow hub to be inserted with said shaft and a hub extension connecting said hollow hub to said second flush handle;
a second flush handle assembly housing partially enclosing said second flush handle assembly and serving as a stop member to limit the rotation of said second flush handle assembly, wherein said second flush handle assembly housing comprises a generally C-shaped stop member enclosed by two end members having a hole in the center to accommodate loose insertion of said shaft;
an integral shaft housing unit built as a single unit comprising said first stop member, said second flush handle assembly housing, and a shaft housing having a hollow square head and a threaded body, wherein said integral shaft housing unit is inserted with said shaft;
a single flush lever with one end fastened to said shaft and another end linked by a chain to a flapper valve in a toilet tank so that the user activates a toilet flush by depressing one of said first flush handle and said second flush handle to open the flapper valve; and
a hand-tightening nut to fasten said integral shaft housing unit to the wall of a toilet tank.

2. The dual flush device according to claim 1, wherein said hub extension of said second flush handle assembly is installed with an adjustable screw to further limit the rotation of said second flush handle assembly within said second flush handle assembly housing, wherein an end cap larger than the body of said adjustable screw is installed at a tip of said adjustable screw to prevent damage to said adjustable screw and said second flush handle assembly housing.

3. The dual flush device according to claim 1, wherein a tip of said shaft has a generally rectangular shape to mate with a rectangular hole in said single flush lever, wherein there is one of a smooth hole and a threaded hole on said tip of said shaft perpendicular to the axis of said shaft, wherein one of a cotter pin and a screw is inserted into said hole after the mounting of said flush lever on said tip of said shaft to fasten said lever to said shaft.

4. A float assembly being mountable over an existing overflow tube in a toilet tank, said float assembly comprising:
a float adapted for moving vertically downward following a linear path with decreasing water level in the tank when activated in a partial flush and for moving vertically upward following a linear path with rising water level during tank refill;
a mounting structure being mountable over the overflow tube and serving as a stop member to limit the vertically downward and upward movement of said float, wherein said mounting structure comprises a mounting lug near a top;
a vertical bar being installed on said mounting structure to guide the vertical movement of said float; and
a vertically mountable disk comprising a hole near a top for being pivotally mountable on said mounting lug near the top of said mounting structure to engage said float to keep said float in place, when said float is in a deactivated position in a full flush.

5. The float assembly according to claim 4, wherein said float assembly is in use with a dual flush device being mountable through a mounting hole in a wall of a toilet tank and comprising two overlapping flush handles to rotate a single rotational shaft and control a single flush lever in the tank to allow a user to selectively activate either a full flush or a partial flush using a volume of water less than a volume of water used in said full flush, wherein said dual flush device comprises:
   a single rotational shaft being rotatably supported in the mounting hole of a tank wall, wherein said shaft is adapted for being rotated from an initial position to a full flush position and returning to said initial position from said full flush position, and wherein said shaft is adapted for being rotated from said initial position to a partial flush position and returning to said initial position from said partial flush position;
   a first flush handle being fastened to said shaft and activated downward rotated by the user to rotate said shaft;
   a first stop member being positioned inside a hub of said first flush handle to limit the rotation of said first flush handle and said shaft;
   a second flush handle assembly being loosely inserted with said shaft, wherein said second flush handle assembly comprises a second flush handle having a transverse extension to overlap and rest on top of an extension of said first flush handle, wherein said second flush handle assembly is activated by the user to downward rotate said second flush handle to downward rotate said first flush handle to rotate said shaft, wherein said second flush handle assembly further comprises a hollow hub to be inserted with said shaft and a hub extension connecting said hollow hub to said second flush handle, wherein said hub extension of said second flush handle assembly is installed with an adjustable screw and an end cap larger than a body of said adjustable screw is installed at a tip of said adjustable screw;
   a second flush handle assembly housing partially enclosing said second flush handle assembly and serving as a stop member to limit the rotation of said second flush handle assembly, wherein said second flush handle assembly housing comprises a generally C-shaped stop member enclosed by two end members having a hole in the center to accommodate loose insertion of said shaft;
   an integral shaft housing unit built as a single unit comprising said first stop member, said second flush handle assembly housing, and a shaft housing having a hollow square head and a threaded body, wherein said integral shaft housing unit is inserted with said shaft;
   a single flush lever with one end fastened to said shaft and another end linked by a chain to a flapper valve in a toilet tank so that the user activates a toilet flush by depressing one of said first flush handle and said second flush handle to open the flapper valve; and
   a hand-tightening nut to fasten said integral shaft housing unit to the wall of a toilet tank.

6. The float assembly according to claim 4, wherein said float comprises a projection on one side having a hole to engage said vertical bar, wherein said float has a vertical length that is one of being fixed and being adjustable by inserting a vertical screw into said float and attaching to a lower end of said vertical screw a cap that is larger than a body of said vertical screw and is lowered or raised by turning said vertical screw accordingly.

7. The float assembly according to claim 4, wherein said mounting structure comprises a hollow double-wall shell with a gap between an outer wall and an inner wall to mate with an upper wall of the overflow tube, wherein on to of said mounting structure there is at least one notch comprising a cutout by removing a small portion of said outer wall to expose said inner wall where a fastener is installed to fasten said mounting structure to the overflow tube to prevent any axial or lateral movement of said float assembly.

8. The float assembly according to claim 4, wherein said mounting structure comprises a top protruding section having a hole to be inserted with said vertical bar and a bottom protruding section having a hole to anchor a lower end of said vertical bar, wherein said mounting structure confines the vertical movement of said float between said top and bottom protruding sections.

9. The float assembly according to claim 4, wherein said vertically mountable disk comprises a projection on one side of said hole that is pivotally mounted on said mounting lug near the to of said mounting structure to engage a lower surface of said float, and an eyelet on an opposite side of said hole linked to a flush lever by a chain that is used to pivotally rotate said disk to disengage and allow said float to vertically descend with the tank water level in a partial flush and to vertically rise afterward with the tank water level during tank refill; wherein said disk is heavier on the side where said eyelet is located than the opposite side where said projection is located to keep said float in place when said float is in a deactivated position in a full flush.

10. A float assembly being mountable over an existing overflow tube and in use with an existing single flush handle and lever assembly in a conventional toilet to allow a user to selectively activate either a full flush or a partial flush using a volume of water less than a volume of water used in said full flush, said float assembly comprising:
   a float adapted for moving vertically downward following a linear path with decreasing water level in the tank when activated and for moving vertically upward following a linear path with rising water level during tank refill;
   a mounting structure being mountable over the overflow tube and serving as a stop member to limit the vertically downward and upward movement of said float;
   a vertical bar being installed on said mounting structure to guide the vertical movement of said float, and
   wherein said float comprises a projection on one side having a hole to engage said vertical bar, wherein said float has a vertical length that is one of being fixed and being adjustable by inserting a vertical screw into said float and attaching to a lower end of said vertical screw a cap that is larger than a body of said vertical screw and is lowered or raised by turning said vertical screw accordingly.

11. The float assembly according to claim 10, wherein said mounting structure comprises a hollow double-wall shell with a gap between an outer wall and an inner wall to mate with an upper wall of the overflow tube, wherein on to of said mounting structure there is at least one notch comprising a cutout by removing a small portion of said outer wall to expose said inner wall where a fastener is installed to fasten said mounting structure to the overflow tube to prevent any axial or lateral movement of said float assembly.

12. The float assembly according to claim 10, wherein said mounting structure comprises a top protruding section having a hole to be inserted with said vertical bar and a bottom protruding section having a hole to anchor a lower end of said vertical bar, wherein said mounting structure confines the vertically downward and upward movement of said float between said top and bottom protruding sections.

\* \* \* \* \*